April 27, 1954 E. E. MASTERSON 2,676,808

SLIDING CARRIAGE PICKUP ASSEMBLY

Filed Dec. 31, 1948

INVENTOR
EARL E. MASTERSON
BY Morris A. Rakin
ATTORNEY

Patented Apr. 27, 1954

2,676,808

UNITED STATES PATENT OFFICE 2,676,808

SLIDING CARRIAGE PICKUP ASSEMBLY

Earl E. Masterson, Palmyra, N. J., assignor to Radio Corporation of America, a corporation of Delaware Application December 31, 1948, Serial No. 68,616

8 Claims. (Cl. 274—23)

Figures 1, 2, 3:
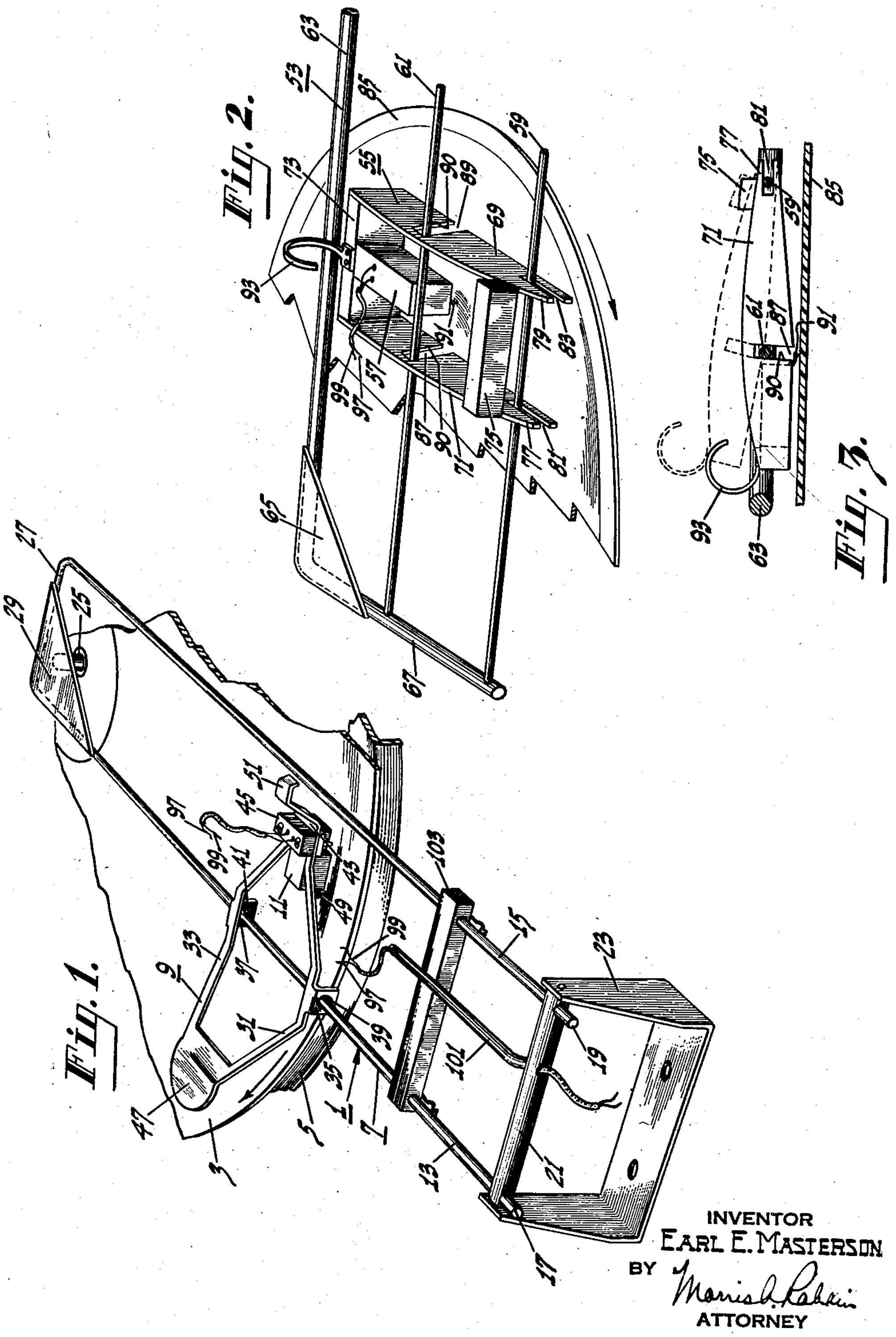

This invention relates to phonographic apparatus, and more particularly to a sliding carriage pick-up assembly therefor.

In conventional phonographs, there is provided a sound translating device such as a pick-up unit which has a stylus for traversing the grooved area of a phonograph record. The pick-up unit is usually mounted on a tone arm which is pivoted at a point beyond the periphery of the turntable for movement in a horizontal plane. In traversing the grooved area of the record, the stylus follows an arcuate path and is not kept tangent to the record groove at all times. Because of this, tracking errors develop which cause considerable distortion in the response. In order to provide proper tracking for the stylus, the pick-up should follow a radial path across the record, so that the stylus will always engage the record groove at a point of tangency.

Various means have been proposed heretofore to provide, a practical, sliding carriage type pick-up mounting which will travel in a radial path across the record, such, for example, as the radial bar and suspension carriage shown in the patent to R. D. Cargill, 1,868,304, of July 19, 1932.

Most prior art devices of this kind have undoubtedly proved unsuccessful because they do not provide an almost frictionless carriage slide. The sole actuating force for moving the pick-up radially across the record is provided through contact between the stylus and the record groove, and any friction between the carriage and its guide seriously affects the efficiency and response of the pick-up, especially when providing tracking for styli of low pressure, light weight pick-ups in connection with high fidelity, narrow groove records, or the like. The prior art sliding carriage type devices, no doubt, have also failed because the arrangement of parts is too complicated and costly to manufacture, which makes them undesirable over other types of conventional tone arms.

It is the primary object of my invention to provide a light weight, balanced carriage and guide means for guiding and controlling a pick-up device in a radial path across a phonograph record, and wherein a relatively light weight stylus pressure may be used to engage the record groove.

A further object of my invention is to provide an improved, balanced, sliding carriage and guide means for low pressure, phonograph pick-up devices, or the like, whereby the pick-up device may traverse a record radially with a minimum of frictional impedance.

It is still another object of my invention to provide a sliding carriage type pick-up mounting which will maintain the stylus tangent to the record grove at all times.

It is also an object of my invention to provide an improved sliding carriage pick-up mounting for sound translating devices which will eliminate the objectionable features of conventional tone arm pick-up devices, such as, high inertia, tone arm resonance, and tracking error, as well as other disadvantages characteristic of prior art sliding carriage pick-up assemblies.

It is another object of my invention to provide a sliding carriage type pick-up assembly which is highly efficient, and which requires a minimum number of parts, thereby making it simple and easy to construct at a minimum of cost.

In accordance with my present invention, I provide a guide element which extends in a radial direction across a phonograph turntable and has a carriage of light weight material slidably mounted thereon. A pick-up device, of any suitable kind, having a stylus for engaging the sound groove of a phonograph record, is attached to the carriage and traverses a radial path across the record, being guided in its path by the guide element. The combined weight of the carriage and pick-up is centered in (1) a first plane passing through the tip of the stylus and lying in the path of its radial movement across the record face, and (2) a second plane normal to said first plane and also passing through the stylus tip. That is, the combined weight of carriage and pick-up is equally distributed about the stylus tip so that the carriage and pick-up are effectively balanced on the stylus tip or point. The carriage is guided by one or more substantially parallel rods which form the guide element and which extend in a radial direction across the record from a point outside the periphery of the phonograph turntable and in parallel, spaced relation thereto. Thus, with this arrangement, the weight of the pick-up and its carriage will be borne by the stylus, and the carriage will only slightly touch the guide element merely to receive guidance therefrom. Hence, the frictional contact between the guide element and carriage is at all times maintained at a minimum. In accordance with one embodiment of my invention, the carriage is provided with horizontal and vertical slots, through which the aforementioned parallel rods extend for guiding the carriage and pick-up in their movement across the record. The rod which extends through the horizontal slots maintains the carriage level during the tracking process, and also provides a fulcrum about which the carriage may be moved in a vertical direction. The rod which extends through the vertical slots cooperates with a wall of the vertical slots and guides the stylus in a true vertical path as it rises and falls in following the surface of a record. Providing true vertical movement for the stylus, particularly when warped records are used, reduces "wow," thereby contributing to improvement in response.

The novel features of my invention, as well as additional objects and advantages theerof, will be better understood from the following detailed description of two embodiments thereof when read in connection with the accompanying drawing, in which Figure 1 is a perspective view of a sliding carriage pick-up assembly in accordance with one embodiment of my invention, Figure 2 is a perspective view, partly cut away, of another embodiment of my invention, and Figure 3 is a side view, partly in section, of the embodiment shown in Figure 2, the carriage being shown in lowered position in full lines and in raised position in dash lines.

Referring more particularly to the drawing, wherein similar reference characters designate corresponding parts throughout, there is shown, in Figure 1, a sliding carriage pick-up assembly 1 associated with a disc type phonograph record 3 which is supported for rotation on a turntable 5 of a conventional phonograph. The pick-up assembly 1, according to one embodiment, comprises a guide member 7, a carriage 9, and a pick-up 11.

The guide member or element 7 comprises a framework of parallel, spaced apart, rod-like members or arms 13, 15. The rod-like members have adjacent ends 17, 19 thereof connected by another rod-like member 21 which is pivotally mounted on a suitable support or pedestal 23 and permits the guide member to be rotated in a vertical direction in order to facilitate changing records. The support or pedestal 23 is secured beyond the periphery of the turntable to a suitable support, usually the motor board of the phonograph, so that the rod-like members 13, 15 will extend in a radial direction across the record 3 toward the spindle 25 of the motor which drives the turntable 5. The guide member 7 is, therefore, analogous to a lever of the second class, wherein the support 23 comprises the fulcrum of the lever. The rod-like members 13, 15 are of sufficient length to extend to a point just beyond the spindle 25, and are connected by an end member 27. A plate-like member 29, or other suitable supporting means, is attached adjacent the end member 27 and permits that end of the guide member 7 to rest on the spindle 25. Thus, the guide member is supported in an operative position between the pedestal 23 and the spindle 25 in spaced, substantially parallel relation to the record 3 and the turntable 5. One of the rod-like members (for example, the rod 13) is provided with a smooth, preferably rounded, bearing surface upon which the carriage 9 is slidably mounted.

The carriage 9 comprises a frame made of very light weight material, such as aluminum, in order to keep the weight thereof at a minimum. The carriage 9 comprises two spaced apart arms or members 31, 33 which are connected at their ends and extend transversely across the rod-like member 13. The arms 31, 33 are so arranged that the carriage 9 has a central axis disposed in a vertical plane perpendicular to the rod 13. In order to facilitate mounting of the carriage 9 upon the rod 13, and, for the purpose of guiding the carriage in its radial movement across the record 3, the arms 31, 33 are provided, respectively, with vertical flanges or extensions 35, 37 having apertures 39, 41 therein. The flanges 35, 37 and their respective apertures 39, 41 are aligned so that the member 13 will extend through the apertures. With this arrangement, the carriage is slidably mounted on the guide member 7. One end 43 of the carriage 9 is provided with a suitable support or connection 45 for attaching the pick-up 11 thereto. The opposite end 47 is somewhat enlarged and provides a convenient means by which the pick-up 11 may be raised from its tracking position with the record 3.

The pick-up 11, which is provided with a stylus 49 in the plane of the above-mentioned central axis for engaging the sound groove of the record 3, may be of any suitable kind. However, it should be as small in size and weight as possible in order to keep the mass and weight of the assembly at a minimum. For the purpose of minimizing friction between the rod-like member 13 and the flanges 35, 37 on the carriage 9, the carriage and pick-up are arranged so that their combined mass is centered about a point corresponding with that of the tip of the stylus 49. That is, the combined weight of the carriage and pick-up is effectively carried by the stylus and balanced on the stylus tip. Thus, the end 47 of the carriage is enlarged to the extent necessary to counterbalance the carriage assembly. It will, therefore, be observed that the rod-like element 13 will act only as a guide for the carriage 9 but does not support the carriage and pick-up assembly. Thus, the only force acting on the rod 13 is that resulting from the pick-up drag on the record. It may be noted at this point that the carriage 9 is comparable to a lever of the first class wherein the stylus 49 comprises the fulcrum of the lever.

In order that rotation of the carriage 9 and pick-up 11 about the rod-like member 13 may be limited when the pick-up assembly 1 is raised for the purpose of changing records, a hook-like member 51, which will engage the rod 15, is disposed on the end 43 adjacent the pick-up connection 45. The member 51 should be arranged so that it will be disposed in spaced relation to the rod-like member 15 when the assembly is in an operative position to thereby permit the rise and fall of the pick-up when tracking warped records or records of varying thicknesses.

A second embodiment of my present invention, illustrated in Figures 2 and 3, comprises the same essential elements as the embodiment shown in Figure 1, namely, a guide member 53, a carriage 55 slidably mounted on the guide member 53 and a pick-up 57 carried by the carriage 55.

The guide member or element 53 is similar to the guide member 7 except that three spaced apart, parallel, rod-like members 59, 61, 63 are employed instead of two, as in the modification of Figure 1. The guide member 53 is likewise provided with supporting means 65 which permits the end 67 thereof to be supported on the spindle. The opposite end of the member 53 is pivotally connected to a support in the same way as the guide member 7 is supported by the pedestal 23. Thus, the guide member 53 is also analogous to a lever of the second class.

The carriage 55 comprises two spaced apart plate members 69, 71 which are connected at one end by an end plate 73, and at the other end by a counterbalancing member 75. The ends 77, 79 of the plates are bifurcated to provide horizontally disposed, aligned slots 81, 83 through which the rod-like member 59 extends, to thereby maintain the carriage 55 and pick-up 57 level and parallel with respect to the record 85 as they traverse a radial path across the record. The plates are also provided with substantially vertical slots 87, 89 intermediate the ends thereof which are also aligned and through which the rod-like member 61 extends. As shown in Figure 3, the slots 87, 89 are disposed slightly off vertical to provide a cam surface 90 which will guide the stylus 91 in a true vertical path as it rises and falls in following an uneven record surface, as in the case of warped records or records of varying thickness.

It may be pointed out at this time that, in the embodiment of my invention shown in Figure 1, the vertical movement of the stylus 49 during tracking follows a slightly arcuate path, inasmuch as the carriage 9 rotates about the rod-like member 13. This may cause some wow and impair the response. However, with the arrangement provided by the embodiment shown in Figures 2 and 3, the stylus follows a true vertical path during tracking, which eliminates wow and provides improved response.

The pick-up 57 is attached to the end plate 73 and the combined weight of the carriage 55 and pick-up 57 are balanced on the tip of the stylus 91. To facilitate lifting of the pick-up 57 from its engaged position with the record 85, a hook-like member or lift bar 93 is attached to the end plate 73, while the rod-like member 59 provides the necessary fulcrum about which the carriage 55 may be rotated in a vertical plane, as seen in Figure 3 of the drawing. In this respect the carriage 55 is comparable to a lever of the first class, the same as the carriage 9.

As in the case of the first embodiment described above, the combined weight of the carriage 53 and pick-up 57 is arranged so that it is balanced upon the tip of the stylus 91, thereby minimizing frictional drag on the rod-like member 59. As a further means of reducing frictional drag on the rod-like members 59, 61 by the carriage 55, the rod-like members are provided with highly polished, preferably rounded, bearing surfaces.

In order that the pick-ups 11, 57 may be connected to an audio amplifier, electrically conductive leads 97, 99 are provided which are supported by a conduit or tube 101 attached to the pivoted, rod-like member 21 as shown in Figure 1 of the drawing.

For the purpose of accurately positioning the pick-up stylus with respect to the starting point of the record groove, an adjustable stop 103 is provided on the rod-like members 13, 15. Inasmuch as the guide member 7 is pivoted from a point beyond the periphery of the turntable for movement in a vertical direction, the guide member 7 may be raised from the end adjacent the spindle 25 and the carriage 9 will readily slide along the rod-like members 13, 15 until it engages the stop 103, and the stylus 49 will then be in a starting position with respect to the record groove.

While the pick-up assemblies described above are arranged to be moved in a vertical direction, in order to facilitate changing records, other methods of removing the assembly may be employed, such, for example, as swinging the arm in a horizontal position by use of a vertical bearing or pivotal member.

From the foregoing description it will be recognized by persons skilled in the art that my present invention provides an improved carriage and pick-up assembly which, because of its small, simple, light weight, balanced structure, may be said to "float" upon the guide member as it traverses a radial path across the phonograph record. What little friction there may be between the carriage and its guide rod is actually beneficial in damping out any vibrations of the tuned system consisting of (1) the mass of the carriage and pick-up assembly and (2) the compliance of the stylus. Moreover, because of the small mass of the moving parts, tone arm resonance is almost entirely eliminated and response is considerably improved.

While I have illustrated but two modifications of my present invention, it will also be recognized by those persons skilled in the art that other modifications and changes will readily suggest themselves. Therefore, I desire that the particular form of my invention described herein shall be considered as illustrative and not as limiting.

What is claimed is:

1. A phonograph pick-up assembly for use in connection with a phonograph record having a sound groove, said assembly comprising a carriage in the form of a lever, a pick-up having a stylus carried by said carriage and disposed intermediate the ends of said carriage, the tip of said stylus comprising the fulcrum of said lever and being adapted to travel in said record sound groove, means disposed at each end of said carriage for counterbalancing said carriage on said stylus tip, said counterbalancing means at one end of said carriage comprising said pick-up, and guide means intermediate the ends of said carriage for guiding said stylus in a radial direction across said record.

2. The invention set forth in claim 1 wherein said assembly includes a support for said guide means, said support being mounted in spaced relation to said record and one end of said guide means being pivotally attached to said support whereby said guide means comprises a lever of the second class, said support comprising the fulcrum of said second class lever.

3. A pick-up assembly for a phonograph having a turntable on which a phonograph record may be mounted for rotation, said assembly comprising a carriage, a pick-up having a stylus, said pick-up being attached to said carriage, said carriage and said pick-up having their combined weight counterbalanced about a point corresponding with that of the tip of said stylus, and a guide element connected to said carriage and including support means at opposite ends thereof, said guide element extending across said record for guiding said stylus in a radial path across said record, said carriage comprising a frame having a central axis, said frame having counterbalancing members at opposite ends thereof, one of said counterbalancing members comprising said pick-up, said stylus being suspended from said pick-up and disposed in the vertical plane of said axis.

4. The invention set forth in claim 3 wherein said guide element support means includes a pivotal support mounted beyond the periphery of said turntable, and wherein said guide element comprises a frame in the form of a lever of the second class having one end thereof attached to said pivotal support, said pivotal support comprising the fulcrum of said lever.

5. The invention set forth in claim 4 wherein said carriage is provided with guide means operatively connected to said guide element for maintaining said carriage and said pick-up parallel to said record and for guiding said stylus in a vertical path with respect to said record.

6. The invention set forth in claim 5 wherein said guide element is provided with adjustable stop means for positioning said stylus in a starting position with respect to said record.

7. A balanced carriage and guide means for low pressure, phonograph pick-up devices which traverse the grooved area of a phonograph record in a radial path, said carriage and guide means comprising a guide element extending radially across said record in parallel, spaced relation thereto, a carriage comprising a frame having a pair of spaced apart, elongated members slidably mounted upon and extending transversely across said guide element, and a pick-up device mounted upon said carriage and having a stylus adapted to engage said record groove, said carriage and said pick-up having their combined weight carried by said stylus and being balanced about a point corresponding with that of the tip of said stylus whereby the frictional impedance between said guide element and said carriage is at all times maintained at a minimum, said guide element comprising at least two rod-like members, and said carriage members have bifurcated ends defining longitudinally extending aligned slots through which one of said rod-like members extends, said bifurcated ends providing guide means for maintaining said carriage and said pick-up parallel to said record.

8. The invention set forth in claim 7 wherein each of said carriage members is provided with a vertical slot intermediate the ends thereof, said slots being aligned in a plane passing through said stylus and having the other rod-like member extending therethrough, said vertical slots having one wall thereof providing a cam surface for guiding said stylus in a vertical path as said carriage and said pick-up are moved in directions normal to their said radial movement.

References Cited in the file of this patent

UNITED STATES PATENTS

| Number | Name | Date |
|---|---|---|
| 665,601 | Hart | Jan. 8, 1901 |
| 836,470 | Smith | Nov. 20, 1906 |
| 898,283 | Stuart | Sept. 8, 1908 |
| 1,027,350 | MiKorey | May 21, 1912 |
| 1,095,225 | Norton | May 5, 1914 |
| 2,413,206 | Worsham | Dec. 24, 1946 |

FOREIGN PATENTS

| Number | Country | Date |
|---|---|---|
| 684,418 | France | June 25, 1930 |
| 564,536 | Germany | Nov. 19, 1932 |
| 846,487 | France | Sept. 18, 1939 |